July 13, 1954
N. F. MOODY
2,683,806
DISCRIMINATOR CIRCUIT
Filed March 16, 1953
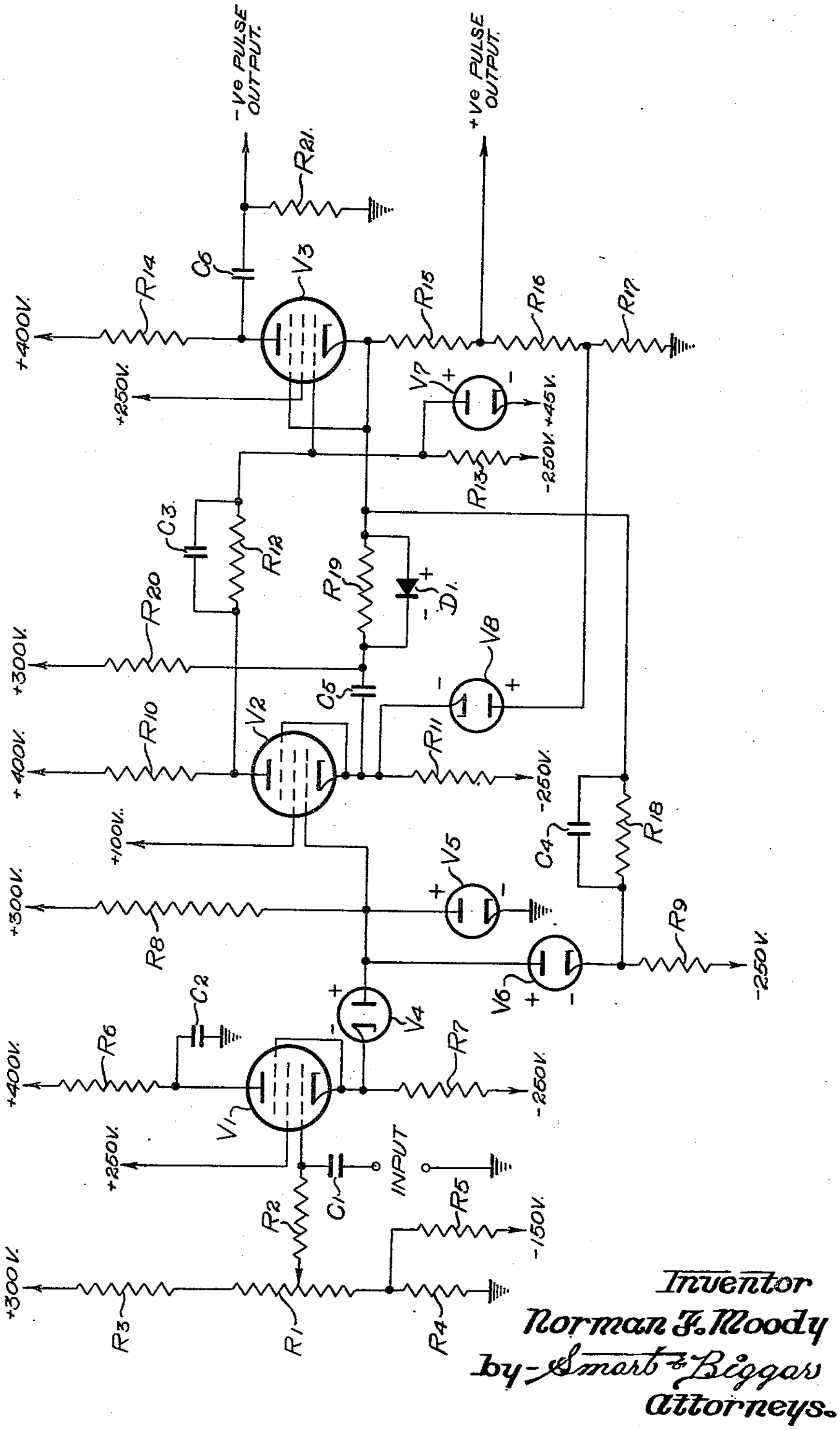
Inventor
Norman F. Moody
by Smart & Biggar
Attorneys.

Patented July 13, 1954 2,683,806

UNITED STATES PATENT OFFICE 2,683,806

DISCRIMINATOR CIRCUIT

Norman F. Moody, London, England, assignor to National Research Council, Ottawa, Ontario, Canada, a body corporate Application March 16, 1953, Serial No. 342,561

Claims priority, application Canada March 31, 1952

16 Claims. (Cl. 250—27)

The invention relates to a voltage discriminator circuit and is particularly concerned with a circuit of the trigger type which provides an output pulse of a predetermined magnitude for each input pulse which exceeds a predetermined voltage level.

In a voltage discriminator circuit of the trigger type it is important that the circuit be of high sensitivity and that there be negligible change in sensitivity during ageing of the components of the circuit. In trigger circuits known prior to the present invention, two tubes have been arranged in a flip-flop circuit having two stable states, stability being achieved by forcing the circuit from one stable state into the threshold of linear, extremely high gain from which the circuit flops over into its other stable state where the loop gain becomes zero. Thus, initially, the first tube would be conducting and the second tube would be biased off. Upon receipt of a negative input pulse, the first tube would amplify, generally non-linearly at first because it would be bottomed (that is, it would be operating near the knee of its plate characteristic), and then it would amplify linearly until the second tube conducts, at which time the positive feedback makes the gain of the circuit rise very rapidly. The circuit then changes over with the second tube conducting and the first tube non-conducting. The circuit recovers to its original state, either by allowing a time constant to relax, giving a shaped output pulse, or by the input signal voltage becoming reduced to a value below the triggering threshold. The Schmitt trigger circuit (described in the book "Electronics," Elmore and Sands, McGraw-Hill Book Company, New York, 1949, at pages 99–103), and binary pairs operate in this manner and all suffer from certain inherent limitations when required to accept very fast pulses. In the first place, the gain of these prior art circuits for high frequencies (10 to 20 megacycles) is low, and the circuits will only change states when the anode of the first tube has risen 10 to 20 volts, which when referred to the grid circuit of the first tube, indicates that the tube must start conducting near the knee of its plate characteristic, and a large input signal is required, particularly if the input signal is a very narrow pulse, for example, .05 microsecond. Also, the charge which is always contained in the capacities existing at the anode of the first tube must be removed before the circuit will revert to its other state.

The present invention overcomes the instability and the lack of sensitivity found in previously known triggered discriminator circuits, when used for very fast pulses requiring a high resolving power, by providing a circuit in which both tubes are conducting with initially high loop gain, the circuit being stabilized by means of a negative feedback path which is removed upon triggering of the circuit.

A voltage discriminator circuit according to the present invention comprises a first and a second amplifier tube, the anode of the first tube being coupled to the control grid of the second tube so that the voltage of the control grid of the second tube tends to vary according to that of the anode of the first tube; a negative feedback circuit from the cathode circuit of the second tube to the control grid of the first tube; means for supplying operating voltages to each said tube so that each tube is in a conducting state with said negative feedback circuit stabilizing the current in the first tube; a first, a second and a third rectifying means of which each has its positive pole connected to the control grid of the first tube; the first rectifying means having its negative pole connected to an input connection for said discriminator circuit, the input connection including means for setting the negative pole of the first rectifying means at a predetermined positive voltage; the second rectifying means series connecting the negative feedback circuit to the control grid of the first tube; the third rectifying means having its negative pole connected to a source of fixed reference potential; means connected to the control grid of the first tube for supplying current from a source of potential which is positive with respect to the fixed reference potential; and an output connection from the anode-cathode circuit of the second tube.

Preferably, according to the present invention, a positive feedback circuit is connected from the cathode circuit of the second tube to the cathode circuit of the first tube so that as soon as the circuit is triggered its amplification is greatly increased due to the positive feedback. It is also preferred to have a rectifying means with its positive pole connected to the control grid of the second tube and having its negative pole connected to a source of positive voltage of predetermined value, so that the control grid voltage of the second tube is set at a fixed voltage upon the circuit being triggered.

In a circuit according to the present invention both of the tubes in the trigger circuit are conducting with high loop gain and the circuit is stabilized by means of a negative feedback circuit. Upon the circuit being triggered, the negative feedback circuit becomes disconnected due to the action of a rectifying means connected in it and the positive feedback circuit increases the loop gain. A circuit according to the invention can have a high resolution and, if desired, its resolving time can be varied and set so that the circuit rejects spurious input pulses such as may be caused by a noise pulse on the trailing edge of a signal pulse. When the dead time is preset, the circuit will extend the dead time to equal the length of the input pulse should the latter exceed the chosen dead time. In this way double counting of a wide pulse is avoided.

The invention will be further described with reference to the attached drawing which shows a schematic circuit diagram of a preferred form of a voltage discriminator circuit according to the invention.

The input to the circuit shown in the drawing is through a condenser C1 connected to the control grid of a pentode type tube V1. The control grid of the tube V1 is also connected to the variable tap of a multi-turn, helical potentiometer R1 through series-connected resistor R2. One end of the potentiometer R1 is connected to a source of +300 volts through a resistor R3 and its other end is connected to ground and to a source of −150 volts through resistors R4 and R5, respectively. The screen grid of the tube V1 is supplied from a source of +250 volts, and the anode is supplied from a source of +400 volts through a resistor R6. A condenser C2 provides a bypass path from the anode to ground. The cathode of the tube V1 connects to a source of −250 volts through a resistor R7.

Input to the triggered discriminator circuit, which comprises the two pentode type tubes V2 and V3, is through a diode type tube V4 having its cathode connected to the cathode of the tube V1 and its anode connected to the control grid of the tube V2. Other connections to the control grid are from a source of +300 volts through a resistor R8 and from ground through a diode type tube V5. A third diode type tube V6 has its anode connected to the control grid of the tube V2 and has its cathode connected to a source of −250 volts through a resistor R9. A resistor R12 and a shunt-connected condenser C3 are connected between the anode of the tube V2 and the control grid of the tube V3. The anode of the tube V2 is connected to a source of +400 volts through a resistor R10, and the cathode, is connected to a source of −250 volts through a resistor R11.

The control grid of the tube V3 is connected to a source of −250 volts through a resistor R13 and is connected to a source of +45 volts through a diode type tube V7. Operating voltage for the anode of the tube V3 is supplied from a source of +400 volts through a resistor R14. The cathode of the tube V3 is connected to ground through series-connected resistors R15, R16 and R17. Another connection from the cathode of the tube V3 provides a negative feedback circuit through a resistor R18, a shunt-connected condenser C4, and the diode tube V6. A positive feedback circuit is provided from the cathode of the tube V3 to the cathode of the tube V2 through a resistor R19, a shunt-connected crystal type rectifier D1 and a condenser C5. The junction of the condenser C5, the resistor R19 and the cathode connection of the rectifier D1 is connected to a source of +300 volts through a resistor R20. The screen grid of the tube V3 is supplied from a source of +250 volts. The output of the circuit can be obtained either from the anode of the tube V3 through a series-connected condenser C6 and across a resistor R21 or from the junction point of the resistors R15 and R16 in the cathode circuit of the tube. A second positive feedback circuit is provided from the junction point of the resistors R16 and R17 through a diode tube V8 connected to the cathode of the tube V2.

The following table provides examples of values and characteristics of components which may be used in the circuit shown in the drawing. However, as is customary in designing electronic circuits, the values and characteristics of the components should be selected to suit the particular application of the circuit.

| | |
|---|---|
| R1 | 10 turn helical potentiometer of 0.5% linearity of 20,000 ohms total resistance. |
| R2 | 220,000 ohms. |
| R3 | 75,000 ohms. |
| R4 | 7,000 ohms. |
| R5 | 30,000 ohms. |
| R6 | 4,700 ohms. |
| R7 | 7,500 ohms. |
| R8 | 82,000 ohms. |
| R9 | 41,000 ohms. |
| R10 | 50,000 ohms. |
| R11 | 27,000 ohms. |
| R12 | 25,000 ohms. |
| R13 | 120,000 ohms. |
| R14 | 5,000 ohms. |
| R15 | 330 ohms. |
| R16 | 330 ohms. |
| R17 | 22 ohms. |
| R18 | 3,900 ohms. |
| R19 | 1,000 ohms. |
| R20 | 220,000 ohms. |
| R21 | 330 ohms. |
| C1 | 0.01 mfd. |
| C2 | 0.1 mfd. |
| C3 | 50 mmfd. |
| C4 | 100 mmfd. |
| C5 | Variable 100—6,800 mmfd. |
| C6 | 0.1 mfd. |
| V1 and V3 | British Mullard EF55. |
| V2 | 6AH6. |
| V4 | EA50. |
| V5 and V6 | 6AL5. |
| V7 and V8 | 6AL5. |
| D1 | Crystal diode. |

In the circuit shown in the drawing, the grid potential of the tube V1 is set by adjustment of the potentiometer R1. If the mutual conductance of the tube V1 is 12 milliamperes per volt (as is the case for the British Mullard type tube EF55), the resistance of R7 is 7500 ohms, and the negative potential applied to the resistor R7 is large, e. g., −250 volts as indicated in the drawing, the potential of the cathode of V1 will follow accurately that of the control grid as set by the potentiometer R1. In this case the tube V1 forms part of an A. C. feedback amplifier and the signal generated at the cathode of the tube V1 is developed from an impedance of about 2 or 3 ohms.

Assuming that the diode tube V6 is removed from the circuit, then the diode tubes V4 and V5 are the non-linear elements and the threshold or triggering of the tubes V2 and V3 causes complete discriminator action. The control grid of the tube V2 is held near ground potential by the diode tube V5 which carries current to ground from the resistor R8. Adjusting the potentiometer R1 to raise the cathode voltage of the diode tube V4 causes the diode tube V4 to remain nonconducting until a negative going input pulse overcomes this bias and the tubes V2 and V3 are triggered. The steady current in the diode tubes V5 and V6 insures that any small capacity currents flowing across the diode tube V4 do not trigger the tubes V2 and V3. As the diode tubes V4 and V5 are connected anode to anode their contact potential drift during life is substantially cancelled, giving a degree of compensation in the setting accuracy of the discriminator.

With no input pulse applied to the input terminals of the circuit, the tubes V2 and V3 are conducting with high loop gain, the circuit being stabilized by means of the negative feedback path C4, R18 and V6 to the control grid of the tube V2. Upon an input pulse being received, the impedance of the diode tube V6 is increased reducing the amount of negative feedback and allowing the tubes V2 and V3 to produce gain to the cathode of the tube V3. As soon as the diode tube V6 is biased off the cathode of the tube V3 rises with extreme rapidity biasing off V6 still further.

The tube V2 has its anode potential set just above the knee of its anode characteristic (50 volts in the particular circuit shown in the drawing) and carries as much anode current as is consistent with high gain and limited anode supply voltage. The current for this tube is obtained through the resistor R11 and a small current is directed from the tube through the diode tube V8 and the resistor R17 to ground. The control grid of the tube V3 is D. C. connected to the anode of the tube V2 by means of resistors R12 and R13. The condenser C3, which is shunted across the resistor R12 serves as a "speed-up" condenser to increase the gain at high frequency. The rising anode wave form of the tube V2 brings the control grid of the tube V3 up until it catches on to the +45 volts available at the diode tube V7 and thus a gross overload of the tube V3, overswings and possibility of double output pulses are eliminated. The resistor R20 allows 1 milliampere of current to flow through the resistor R19 to the cathode of the tube V3. The resistance R19 has a value of 1000 ohms so that a 1 volt bias exists across the crystal diode D1 and, consequently, the resistor R19 is effective in the positive feedback path from the cathode of the tube V3 to the cathode of the tube V2. The tube V3 is conducting to a limited extent and has about 10 milliamperes of current at its cathode, but is capable of delivering a high peak current of the order of 250 milliamperes. The cathode impedance of the tube V2 consists of the resistance R11, the non-linear impedance of the diode tube V8 in series with the resistor R17, and the primary positive feedback path through the condenser C5 and the resistor R19 from the low impedance cathode follower V3. The circuit through the diode tube V8 and the resistor R17 constitutes a secondary positive feedback path. As the cathode impedance of V2 is relatively low, the tube V2 is enabled to have high gain (for example, in the order of 100) and, due to the positive feedback through the resistor R19 and the condenser C5 into the cathode impedance $$\frac{1}{g_m}$$

of the tube V2 and, due to the positive feedback through the diode tube V8 and the resistor R17, the loop gain is increased to a very high value. To prevent noise or any other small disturbance upsetting the circuit the output of the tube V3 is fed back to the input of the tube V2 in such phase that it is negative feedback. The use of a diode tube in the feedback path makes a complete analysis quite complex, but to a first order the diode tube can be replaced by equivalent resistances to provide design conditions. Thus, if the impedance of the diode tubes V5 and V6 are equal and the presence of the condenser C4 across the resistor R18 makes (for high frequency purposes) the cathode of the diode tube V6 the same A. C. potential as the cathode of the tube V3 (the diode tube V4 is considered to be biased off in this analysis), the circuit reduces to the form of a normal negative feedback amplifier in which the A factor of the well known gain formula $$G=\frac{A}{1+\beta A}$$

is large due to the internal positive feedback loop. However, according to the present invention diode type tubes carrying D. C. currents are used in conjunction with the feedback circuit. The impedance of the diode tube V6 is relatively low so that the capacity currents from the diode tube V4 tend to cause the circuit to change over from a low gain control feedback amplifier to a trigger circuit.

It will now be assumed that there is an input negative signal at the low impedance cathode of the tube V1 of sufficient magnitude to overcome the bias on the diode tube V4 thereby decreasing its impedance. As the impedance of the diode tube V4 decreases that of the diode tubes V5 and V6 increases and the result is that the $\beta$ factor (feedback ratio) decreases and the output voltage increases. As soon as the change in impedance of the diode tube V6 becomes logarithmic, the cathode voltage of the tube V3 rises rapidly tending to cut off the diode tube V6 and to make the circuit trigger. The loop gain should now be enough to make the circuit unstable and at this point the crystal diode D1 becomes effective. When 1 volt of positive signal is obtained at the cathode of the tube V3 the impedance of the crystal rectifier D1 is reduced by about 2 to 4 times so that it acts as a short circuit across the resistor R19 causing the positive feedback to be increased. A similar action occurs in the diode tube V8 because as the impedance of the diode tube V8 increases, so the amount of positive feedback through the condenser C5 increases. The result is that when enough signal reaches the control grid of the tube V2 (for example, about 0.25 volt) to cause the diode tube V6 to increase its impedance and the crystal diode D1 to reduce its impedance, the anode of the tube V2 rises very rapidly until the control grid of the tube V3 catches on to the +45 volts available through the diode tube V7. The negative feedback diode tube V6 becomes ineffective due to the presence of the condenser C4, and the 45 volt signal appearing at the cathode of the tube V3 is transferred through the condenser C5 to the cathode of the tube V2 raising its potential by 45 volts and biasing off the diode tube V8 by 45 volts. The current traversing the resistor R11 now charges the condenser C5 until the cathode of the tube V2 reaches ground potential, and the time constant of the resistor R11 and the condenser C5 provides the controlled dead time, i. e., sets the width of the output pulse. Even if the cathode of the tube V2 has reached ground potential (it can not go below ground potential because of the circuit through the diode tube V8), the circuit will only recover if the control grid of the tube V2 has negligible negative signal still present, i. e., the dead time will extend to the end of the signal. If desired the dead time can be made variable by providing a plurality of condensers C5 of different values arranged to be individually selected and switched into the circuit, e. g., by means of a switch.

At the moment the input signal ends, the condenser C3 contains a small charge (the time constant of C3 and R12 is short compared to the smallest pulse duration) and C4 is uncharged (the time constant of the C4 and R18 is long compared to the longest pulse duration). The tube V2 bottoms rapidly, the tube V3 is cut off, and the condenser C5 discharges through the diode tube V8. With the tube V2 bottomed, the loop gain will be small and when the condenser C5 has completely discharged, the anode of the tube V2 will rise, the cathode of the tube V3 will rise, and the negative feedback circuit will again assume control through the diode tube V6. As indicated in the drawing, a positive output signal can be obtained from the cathode circuit of the tube V3 and a negative output signal can be obtained from the anode of the tube V3.

As indicated by the above description the invention provides a discriminator circuit of the trigger type in which both of the tubes in the trigger circuit are conducting with initially high loop gain, the circuit being stabilized by a negative feedback circuit which is removed when triggering occurs. The circuit can have high resolution and the width of the output pulse (i. e. the dead time of the circuit) can be preset to a desired value.

What I claim as my invention is:

1. A voltage discriminator circuit comprising a first and a second electronic vacuum tube of which each has at least a cathode, a control grid and an anode; the anode of the first tube being coupled to the control grid of the second tube so that the voltage of the control grid of the second tube tends to vary according to that of the anode of the first tube; a negative feedback circuit from the cathode circuit of the second tube to the control grid of the first tube; means for supplying operating voltages to each said tube so that each tube is in a conducting state with said negative feedback circuit stabilizing the current in the first tube; a first, a second and a third rectifying means of which each has its positive pole connected to the control grid of the first tube; the first rectifying means having its negative pole connected to an input connection for said discriminator circuit, said input connection including means for setting the negative pole of the first rectifying means at a predetermined positive voltage; the second rectifying means series connecting said negative feedback circuit to the control grid of the first tube; the third rectifying means having its negative pole connected to a source of fixed reference potential; means connected to the control grid of the first tube for supplying current from a source of potential which is positive with respect to said fixed reference potential; and an output connection from the anode-cathode circuit of the second tube.

2. A voltage discriminator circuit as defined in claim 1 comprising a first positive feedback circuit from the cathode circuit of the second tube to the cathode circuit of the first tube, said feedback circuit comprising a series resistor in shunt connection with a rectifying means, and means for supplying through said series resistor a direct current of a value which provides a predetermined bias on said rectifying means so that it is of high impedance when the cathode of the second tube has a voltage below a predetermined positive value and is of a low impedance when the cathode of the second tube has a voltage above said predetermined positive value.

3. A voltage discriminator circuit as defined in claim 2 in which the first positive feedback circuit comprises a condenser connected in series from the series resistor to the cathode of the first tube.

4. A voltage discriminator circuit as defined in claim 2 in which the first positive feedback circuit comprises a condenser connected in series from the series resistor to the cathode of the first tube, and in which said cathode of the first tube is connected to a source of negative voltage through a resistor.

5. A voltage discriminator circuit as defined in claim 2, comprising rectifying means having its positive pole connected to the control grid of the second tube and having its negative pole connected to a source of a positive voltage of predetermined value.

6. A voltage discriminator circuit as defined in claim 2, in which the means for setting the negative pole of the first rectifying means at a predetermined positive voltage comprises a third electronic vacuum tube having at least a cathode, a control grid and an anode, means for setting said control grid at a predetermined positive DC bias voltage means for supplying the input pulses to said discriminator circuit to said control grid as negative pulses, a cathode load in the cathode circuit of said cathode, and connections for applying the voltage developed across said cathode load to the negative pole of the first rectifying means.

7. A voltage discriminator circuit as defined in claim 2 in which the means for setting the negative pole of the first rectifying means at a predetermined voltage comprises a third electronic vacuum tube having at least a cathode, a control grid and an anode, means for setting said control grid at a predetermined positive DC bias voltage, means for supplying the input pulses to said discriminator circuit to said control grid as negative pulses, a cathode load in the cathode circuit of said cathode, connections for applying the voltage developed across said cathode load to the negative pole of the first rectifying means, and a fourth rectifying means having its positive pole connected to the control grid of the second tube and having its negative pole connected to a source of a positive voltage of predetermined value.

8. A voltage discriminator circuit as defined in claim 2 comprising a second positive feedback circuit from the cathode circuit of the second tube to the cathode circuit of the first tube, said second positive feedback circuit comprising a series connected rectifying means having its positive pole connected to the cathode circuit of the second tube.

9. A voltage discriminator circuit as defined in claim 8 in which the first positive feedback circuit comprises a condenser connected in series from the series resistor to the cathode of the first tube.

10. A voltage discriminator circuit as defined in claim 8 in which the first positive feedback circuit comprises a condenser connected in series from the series resistor to the cathode of the first tube, and in which said cathode of the first tube is connected to a source of negative voltage through a resistor.

11. A voltage discriminator circuit as defined in claim 8 comprising rectifying means having its positive pole connected to the control grid of the second tube and having its negative pole connected to a source of a positive voltage of predetermined value.

12. A voltage discriminator circuit as defined in claim 8, in which the means for setting the negative pole of the first rectifying means of a predetermined positive voltage comprises a third electronic vacuum tube having at least a cathode, a control grid and an anode, means for setting said control grid at a predetermined positive DC bias voltage, means for supplying the input pulses to said discriminator circuit to said control grid as negative pulses, a cathode load in the cathode circuit of said cathode, and connections for applying the voltage developed across said cathode load to the negative pole of the first rectifying means.

13. A voltage discriminator circuit as defined in claim 8, in which the means for setting the negative pole of the first rectifying means at a predetermined voltage comprises a third electronic vacuum tube having at least a cathode, a control grid and an anode, means for setting said control grid at a predetermined positive DC bias voltage, means for supplying the input pulses to said discriminator circuit to said control grid as negative pulses, a cathode load in the cathode circuit of said cathode, connections for applying the voltage developed across said cathode load to the negative pole of the first rectifying means, and a fourth rectifying means having its positive pole connected to the control grid of the second tube and having its negative pole connected to a source of a positive voltage of predetermined value.

14. A voltage discriminator circuit as defined in claim 1, comprising rectifying means having its positive pole connected to the control grid of the second tube and having its negative pole connected to a source of a positive voltage of predetermined value.

15. A voltage discriminator circuit as defined in claim 1, in which the means for setting the negative pole of the first rectifying means at a predetermined positive voltage comprises a third electronic vacuum tube having at least a cathode, a control grid and an anode, means for setting said control grid at a predetermined positive D. C. bias voltage, means for supplying the input pulses to said discriminator circuit to said control grid as negative pulses, a cathode load in the cathode circuit of said cathode, and connections for applying the voltage developed across said cathode load to the negative pole of the first rectifying means.

16. A voltage discriminator circuit as defined in claim 1, in which the means for setting the negative pole of the first rectifying means at a predetermined voltage comprises a third electronic vacuum tube having at least a cathode, a control grid and an anode, means for setting said control grid at a predetermined positive D. C. bias voltage, means for supplying the input pulses to said discriminator circuit to said control grid as negative pulses, a cathode load in the cathode circuit of said cathode, connections for applying the voltage developed across said cathode load to the negative pole of the first rectifying means, and a fourth rectifying means having its positive pole connected to the control grid of the second tube and having its negative pole connected to a source of a positive voltage of predetermined value.

References Cited in the file of this patent

UNITED STATES PATENTS

| Number | Name | Date |
|---|---|---|
| 2,494,865 | Fleming-Williams et al. | Jan. 17, 1950 |